United States Patent
Nguyen

(10) Patent No.: US 8,417,946 B2
(45) Date of Patent: Apr. 9, 2013

(54) METHOD AND APPARATUS FOR ACCESSING AN ELECTRONIC DEVICE BY A DATA TERMINAL

(75) Inventor: Kim Nguyen, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 11/915,502

(22) PCT Filed: May 24, 2006

(86) PCT No.: PCT/EP2006/062619
§ 371 (c)(1),
(2), (4) Date: Jan. 25, 2008

(87) PCT Pub. No.: WO2006/128829
PCT Pub. Date: Dec. 7, 2006

(65) Prior Publication Data
US 2008/0195858 A1    Aug. 14, 2008

(30) Foreign Application Priority Data
Jun. 2, 2005  (DE) .......................... 10 2005 025 806

(51) Int. Cl.
*H04L 29/06* (2006.01)

(52) U.S. Cl.
USPC ........... 713/167; 713/164; 713/168; 713/169; 713/165; 726/26; 726/27; 726/29

(58) Field of Classification Search .................. 713/167, 713/164
See application file for complete search history.

(56) References Cited

U.S. PATENT DOCUMENTS

| | | | |
|---|---|---|---|
| 5,224,163 A * | 6/1993 | Gasser et al. | 380/30 |
| 6,101,477 A | 8/2000 | Hohle et al. | |
| 6,704,608 B1 * | 3/2004 | Azuma | 700/66 |
| 6,963,980 B1 * | 11/2005 | Mattsson | 713/194 |
| 2002/0008789 A1 | 1/2002 | Harris | |
| 2002/0029347 A1 * | 3/2002 | Edelman | 713/193 |
| 2002/0087894 A1 | 7/2002 | Foley | |
| 2003/0023858 A1 * | 1/2003 | Banerjee et al. | 713/189 |
| 2003/0218328 A1 * | 11/2003 | Conwell | 281/31 |
| 2004/0233040 A1 * | 11/2004 | Lane et al. | 340/5.86 |
| 2005/0009732 A1 | 1/2005 | Vadas et al. | |
| 2005/0097320 A1 | 5/2005 | Golan | |
| 2005/0139681 A1 * | 6/2005 | Premjeyanth et al. | 235/468 |
| 2005/0258238 A1 * | 11/2005 | Chapman | 235/380 |
| 2005/0274794 A1 * | 12/2005 | Bason et al. | 235/380 |

(Continued)

FOREIGN PATENT DOCUMENTS

WO    03005143 A    1/2003

OTHER PUBLICATIONS

Published by Authority of the Secretary General: "Machine Readable Travel Documents Technical Report PKI for / Machine Readable Travel Documents offering ICC Read-Only Access version 1.1" Online pp. 1-57 (2004).*

(Continued)

*Primary Examiner* — Brandon Hoffman
*Assistant Examiner* — Thomas C Lauzon
(74) *Attorney, Agent, or Firm* — Matthew B. Dernier, Esq.; Gibson & Dernier LLP

(57) ABSTRACT

This invention pertains to methods and apparatus for accessing an electronic device by a data terminal, as well as a computer program product, an electronic device and a data terminal.

37 Claims, 4 Drawing Sheets

U.S. PATENT DOCUMENTS

2006/0008150 A1*   1/2006   Zhao et al. .................... 382/190
2007/0122004 A1*   5/2007   Brown et al. ................. 382/115
2007/0192610 A1*   8/2007   Chun et al. .................... 713/176

OTHER PUBLICATIONS

Infineon Technologies: Security & Chip Car ICs SLE 55R16 pp. 1-8 (2001).*

WD-006-2003-04-16, Developmentof a Logical Data Structure—LDS for Optional Capacity Expansion Technologies, First Edition—2003, International Civil Aviation Organization.*

Published by Authority of the Secretary General: "Machine Readable Travel Documents Technical Report PKI for Machine Readable Travel Documents offering ICC Read-Only Access version 1.1" Online pp. 1-57 (2004) URL: http://www.icao.int/mrtd/download/document/TR-PK%20mrtds%20ICC%read-only%20access%20v1_1.pdf>.

Infineon Technologies: Security & Chip Car ICs SLE 55R16 pp. 1-8 (2001)  URL:http://infineon.com/upload/Document/cmc_upload/documents/029/987/SPI_SLE55R16_0101.pdf>.

International Preliminary Report on Patentability for International Application PCT/EP2006/062619.

International Search Report for International Application PCT/EP2006/062619.

* cited by examiner

METHOD AND APPARATUS FOR ACCESSING AN ELECTRONIC DEVICE BY A DATA TERMINAL

BACKGROUND

This invention pertains to methods and apparatus for accessing an electronic device by a data terminal as well as a computer program product, an electronic device and a data terminal.

Methods for electronically storing data under cryptographic protection are already well-known from the state of the art. One form of protected storage, which has found broad acceptance over the last two decades, is electronic chip cards, which are standardized by ISO 7816 Sections 1 through 4. One of the most important application areas for chip card technology in the future is the introduction of machine-readable travel documents. Anticipated benefits of this include an increase in security as well as efficiency in checking passengers, particularly when it comes to global air travel. Over the last several years, the International Civil Aviation Organization ICAO has provided standards for machine-readable travel documents.

Seen alongside the secure storage of personal data in machine-readable travel documents is the goal of simplifying security checks by the largest possible number of governmental and non-governmental organizations and the extent to which personal data is worthy of protection from being read without authorization. A suitable balance between both requirements must allow for both differences in the method of legal data protection and varying extents to which individual data objects are worthy of protection.

A system is known from US 2005/0097320A1 which enables communication between a user and an institution, such as a bank. Communication takes place via a network. A "transaction risk assessment" occurs each time the user accesses the institution's system, which determines the risk of the current transaction.

A similar system is known from US 2002/0087894 A1, where the user himself selects the security level for the data transfer.

From "Machine Readable Travel Documents, Technical Report, PKI for Machine Readable Travel Documents offering ICC Read-Only Access, Version 1.1, 1. October 2004, International Civil Aviation Organization, published by Authority of the Secretary General, pages 1-57, procedures for Basic Access Control are known, which are intended to ensure that access to the chip of a travel document cannot occur unnoticed by the holder of the identifying document. The procedures are also used to protect against so-called "Chip Substitution". The only disclosure regarding possible Extended Access Control is that this can be based either on a symmetrical or asymmetrical encryption process.

On the other hand, the invention is based on the task of creating better procedures for accessing an electronic device by a data terminal, a computer program product, a digital storage medium, an electronic device, a data terminal and an identifying document.

SUMMARY OF THE INVENTION

According to the invention, a method is provided for a data terminal to access one of a number of data objects stored in an electronic device, whereby the electronic device features an allocation table in which a cryptographic protocol of a different security level is assigned to different data objects. The data terminal first transmits a request to the electronic device for a particular one of the data objects. With the aid of the allocation table, the electronic device specifies a cryptographic protocol for that one data object. The electronic device and the data terminal implement the cryptographic protocol. Assuming successful implementation, the electronic device transmits that one data object to the data terminal.

The present invention has a particular advantage in that it enables data objects classified as worthy of different levels of protection, which are stored together in an electronic device serving as a data carrier, to be protected to different degrees and in this way comply flexibly with conflicting demands for accessibility to the stored data objects.

According to one embodiment of the invention, the electronic device features a software application which contains the allocation table. With the aid of the allocation table, the software application determines the cryptographic protocol, implements the specific cryptographic protocol with the data terminal and the software application and, assuming it is successful, sends the one data object to the data terminal. Consequently, all of the procedural steps of the electronic device are implemented by the software application, which has the advantage that the electronic device is built using standardized, cost-effectively produced hardware and the level of cryptographic protection of the data objects can be easily adapted to individual requirements.

According to one embodiment of the invention, the electronic device features an operating system that prevents unauthorized alteration or removal of the software application and only permits access to the data objects via the software application. This function of the operating system ensures that the protection of the data objects implemented by the software application cannot be circumvented or broken by an unauthorized party. Preferably, however, the operating system allows alteration or removal of the software application after authentication as an administrator of the electronic device. This is particularly advantageous because the allocation of individual data objects to cryptographic protocols or the cryptographic protocols themselves can be changed, for example, without having to replace the electronic device. In a preferred but unlimited manner, the invention pertains to a software application implementing the method for a chip card, in particular a Java-Applet for a chip card with an operating system that includes a virtual Java machine.

According to one embodiment of the invention, the electronic device is integrated into an identity document. Identity documents can include, for example, chip cards in check card format, or documents of other formats such as passports or visas, in which the electronic device is embedded. In particular, the identity document can pertain to a machine-readable travel document in accordance with the epassport standardizations of the International Civil Aviation Organization, ICAO. The ICAO defines a file system conforming to the chip card standard ISO 7816-4 for machine-readable travel documents carrying the designation Logical Data Structure (LDS) as well as an interoperable structure of the data stored in the file system.

According to one embodiment of the invention, at least one of the data objects includes personal biometric data. In the case of a machine-readable travel document in accordance with epassport standardizations, the path names and file formats of personal—and also biometric—data are laid down by the LDS. In particular, the storing of a photograph, fingerprints and iris data of the holder of the identity document is standardized. The embodiment is of particular advantage, since for example a different, perhaps lower level of being worthy of protection and thus a cryptographic protocol of a lower security level can be assigned to the photograph than to the fingerprints or iris data.

Depending on the embodiment of the invention, the repertoire of the cryptographic protocols available to the electronic device and the data terminal can comprise different protocols and the allocation of the individual data objects stored in the electronic device can be defined in different ways for the individual cryptographic protocols available. According to the invention, read access can be freely granted, linked to the implementation of a cryptographic protocol, linked to the implementation of one of several cryptographic protocols made available for choosing or linked to the mandatory implementation of several cryptographic protocols. Preferably, free access is assigned to at least one of the number of data objects in the allocation table without a mandatory cryptographic protocol.

According to one embodiment of the invention, a cryptographic protocol of elevated security level is assigned to at least one data object, which requires authentication of the data terminal to the electronic device by means of a Challenge-Response procedure, which is based on a symmetrical cryptographic algorithm. A device-specific key is used here, which the data terminal must derive from machine-readable printed data associated with the electronic device. A general key that must be known to the electronic device and data terminal may also be required to derive the device-specific key.

According to one embodiment of the invention, a cryptographic protocol of a higher security level is assigned to at least one data object, which requires authentication of the data terminal with respect to the electronic device by means of a Challenge-Response procedure based on an asymmetrical cryptographic algorithm. The data terminal has both a public key and a private key in this case. The data terminal sends the electronic device its public key, which is preferably provided with a digital signature that can be verified by the electronic device via a certificate chain. The data terminal subsequently proves to the electronic device in a Challenge-Response sequence, that it is also in possession of the associated private key. Preferably, the implementation of the cryptographic protocol of a higher security level is required in addition to the protocol of an elevated security level.

According to one embodiment of the invention, communication between the data terminal and the electronic device is contactless, preferably via a contactless interface corresponding to the norms ISO/IEC 14443 Parts 1 through 4, as stipulated by the ICAO in the case of machine-readable travel documents. To prevent unauthorized monitoring of the contactless communication by third parties, it is preferable to also assign an encryption protocol of a different security level to the different data objects in the allocation table, according to which the data terminal and electronic device communicate in an encrypted manner. In this way, the data terminal and electronic device preferably exchange a session key in a safe manner.

BRIEF DESCRIPTION OF THE DRAWINGS

In other respects, preferred embodiments of the invention are explained in more detail with reference to the drawings. These include.

DETAILED DESCRIPTION OF THE PRESENT INVENTION

Figure 1:
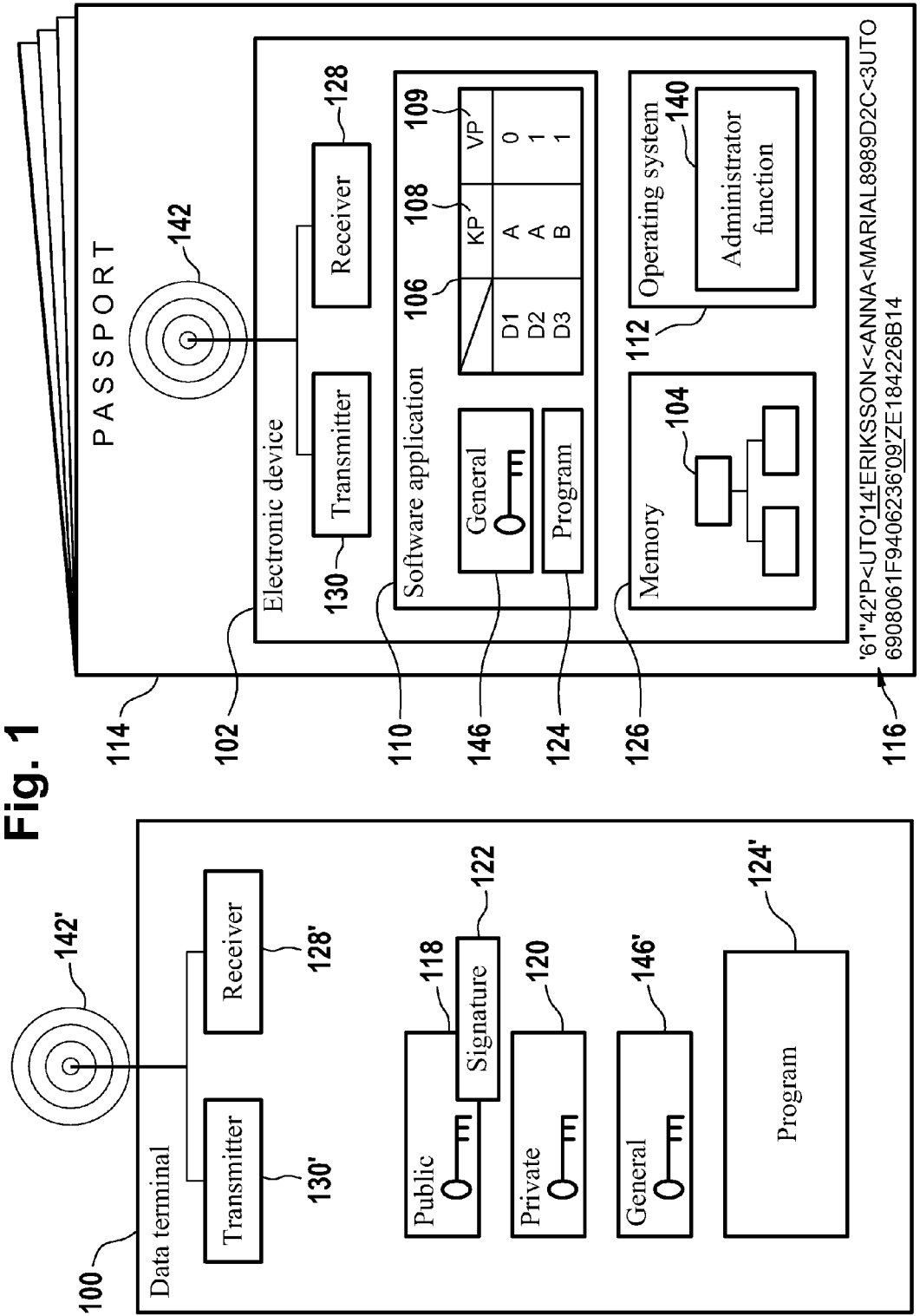
FIG. 1 is a block diagram of an embodiment of the data terminal according to the invention and the electronic device according to the invention.

FIG. 1 shows a block diagram of one embodiment of data terminal 100 and of electronic device 102, which is integrated into an identity document 114. The identifying document is presented as a passport in a schematic, perspective view and features a zone with machine-readable printed data 116. Integration of the electronic device into the identity document can be done, for example, by embedding it into the cover page or the main page of a passport.

Both electronic device 102 and data terminal 100 can have a contactless interface 142 or 142', which is connected to both a transmitter 130 or 130' and a receiver 128 or 128' and facilitates the contactless communication between data terminal and electronic device. Electronic device 102 can feature a memory 126 for a number of data objects 104. Personal biometric data such as a photograph, fingerprints, or iris data of the owner of identity document 114 can be stored in one or more of data objects 104. Storage of data objects 104 in memory 126 may follow the standard series 9303 "Machine-readable Travel Documents" of the International Civil Aviation Organization, ICAO. Under the designation "Logical Data Structure" (LDS), the ICAO defines a file system that conforms to the chip card standard ISO 7816-4 as well as an interoperable structure of the data objects stored in this file system.

Data terminal 100 can be programmed with computer-executable instructions 124', which allow it to read access data objects 104 stored in memory 126 of electronic device 102 via contactless interfaces 142' and 142. To protect the personal biometric data, in particular, from unauthorized readout, electronic device 102 has program instructions 124, which can link read access to data objects 104 to the successful implementation of a cryptographic protocol with data terminal 100. One such measure is recommended by the ICAO, which mentions the support of a number of data protection options as a mandatory requirement for the standardized LDS.

Various types of personal biometric data which are worthy of protection at various levels can be stored in different data objects 104. For example, only slight sensitivity can be attributed to a photograph, while fingerprints or iris data are worthy of a higher level of protection. The various assessments of being worthy of protection of different data objects 104 are coded by allocation table 106 of electronic device 102. Each data object 104 in the allocation table is assigned a cryptographic protocol 108 of a different security level. The allocation table can assign free access without the mandatory implementation of a cryptographic protocol to one or a number of data objects 104.

In operation, electronic device 102 receives a request for one of the data objects 104 from data terminal 100 via receiver 128 and contactless interface 142. Thereupon, using allocation table 106, the electronic device specifies a cryptographic protocol 108, the successful execution of which is set as a condition for read access of the data terminal to one of the data objects. The electronic device and the data terminal carry out the cryptographic protocol and, if successful, the electronic device transmits the one data object to the data terminal.

Electronic device 102 may feature a software application 110, which includes allocation table 106. Cryptographic protocol 108 is thus specified by the software application, the cryptographic protocol is carried out by the data terminal and the software application, and the one data object is transmitted by the software application. The electronic device can feature an operating system 112, which, working together with the hardware of the electronic device, prevents any unauthorized alteration or removal of the software application and only allows access to data objects 104 via the software application. In this way it is possible to implement electronic device 102 on the basis of mass-produced, standardized hardware, while at the same time the specifications of the cryptographic protocols which are being used and the coded allocation of data objects 104 in allocation table 126 can be adapted to cryptographic protocols of varying requirements. The electronic device can be a Java card with a virtual Java machine, on which software application 110 is installed in the form of a Java Applet.

Operating system 112 can protect software application 110 including allocation table 106 from unauthorized alteration or removal, while at the same time feature an administrator function 140, which allows alteration or removal of the software application following authentication as administrator of electronic device 102. The administrator function is especially advantageous because the electronic device can be adapted to revised requirements instead of being replaced by a new electronic device. Revised requirements can pertain, for example, to improved cryptographic protocols 108 or a revised classification of worthiness of protection of different data objects 104.

Various encryption protocols 109 can also be assigned to different data objects in allocation table 106, according to which electronic device 102 and data terminal 100 can encrypt their communication. Encryption is particularly advantageous, since it allows third parties to be prevented from monitoring the contactless communication between the electronic device and the data terminal.

Electronic device 102 and data terminal 100 may have suitable cryptographic keys 118, 120 and 146, which are used in carrying out various cryptographic protocols.

Data terminal 100 can derive another device-specific key for electronic device 102 from machine-readable printed data 116. To this end, the data terminal may feature an optical sensor to read printed data 116 visually. A symmetrical key for communicating with electronic device 102 can thus be obtained from the data so recorded. In one embodiment, data 116 is used as a symmetrical key. This symmetrical key can be stored in unprotected or protected form in electronic device 102. Alternatively, electronic device 102 is designed in such a way that, if needed, it can generate this symmetrical key from data 116 also electronically stored in electronic device 102.

A general key 146 or 146' can also be used, which is familiar to both the electronic device and data terminal 100. The data terminal may also feature an asymmetrical pair of keys from public 118 and private 120 keys, whereby it transmits its public key to the electronic device as part of a cryptographic protocol. The public key can be provided with a digital signature 122, which allows it to verify the authenticity of the key 118 by means of a certificate chain.

General key 146' can be used from data terminal 100, for example, in order to generate the additional symmetrical key from optically recorded data 116. To this end, general key 146' and data 116 are linked together.

Figure 2:
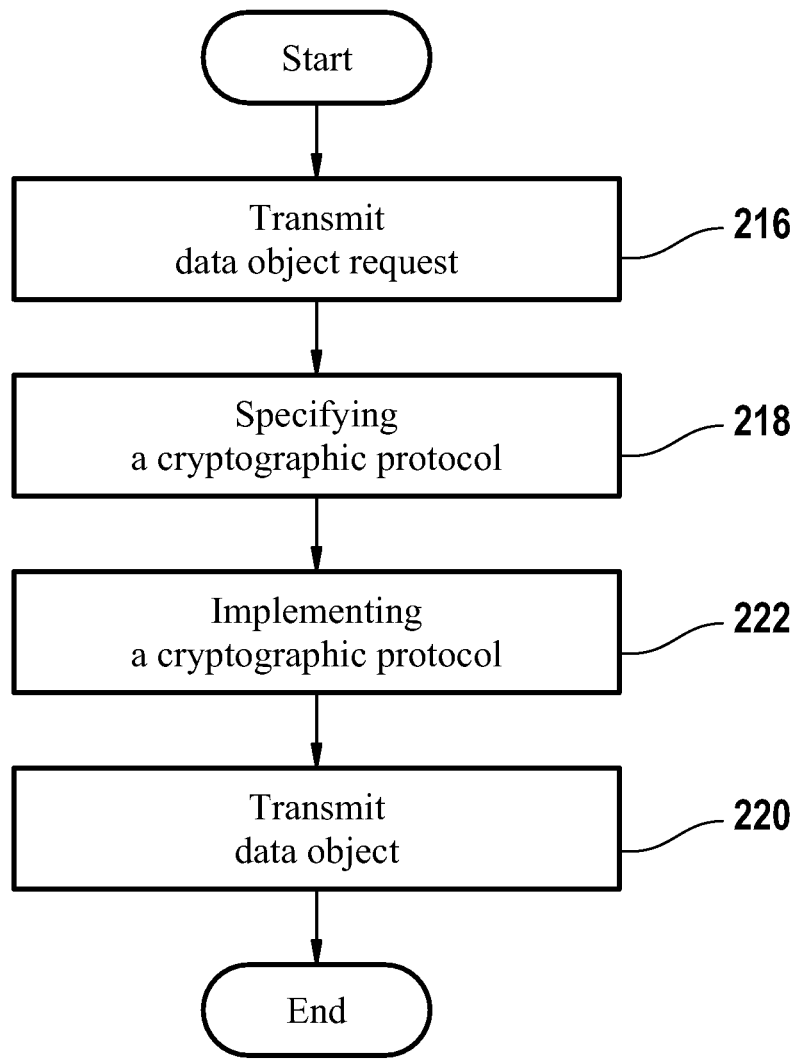
FIG. 2 is a flow chart of the method according to the invention.

FIG. 2 is a flow diagram which shows the method according to the invention for the data terminal to access one of the data objects stored in the electronic device. In step 216, the data terminal transmits a request to the electronic device for the one particular data object. In step 218 the electronic device uses its allocation table to specify a cryptographic protocol. In step 222 the electronic device and the data terminal carry out the cryptographic protocol. In step 220 the electronic device transmits the one data object to the data terminal.

In this context, the coded information in the allocation table of the electronic device, whose cryptographic protocol is assigned to the one data object, may already be known to the data terminal even before transmitting 216 the request. For example, the allocation table currently existing in the electronic device may contain content specified by a standard, which the data terminal also has a copy of. Alternatively, the electronic device may transmit a specification of the cryptographic protocol to the data terminal before its implementation 222, whereby the specification must correspond to one cryptographic protocol out of a repertoire of several, which the data terminal is able to implement. As another alternative, the electronic device can transmit the specification of several cryptographic protocols to the data terminal, from which the data terminal can select any desired protocol which it is able to implement.

Figure 3:
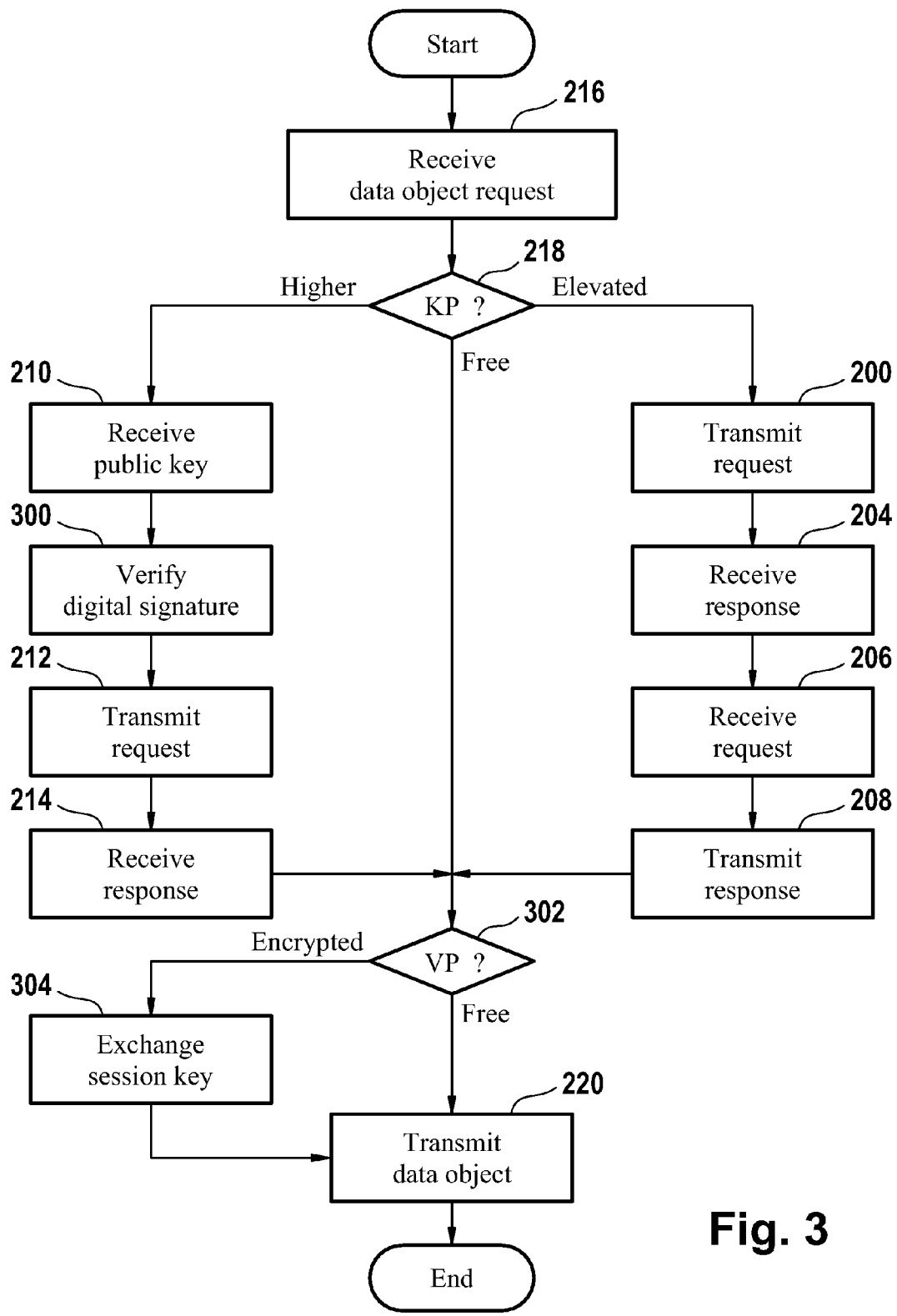
FIG. 3 is a flow chart of the procedural steps implemented by one embodiment of the electronic device according to the invention and FIG. 4 is a flow chart of the procedural steps implemented by one embodiment of the data terminal according to the invention.

FIG. 3 shows a flow chart of the procedural steps implemented by a preferred embodiment of the electronic device according to the invention. After the electronic device has received a request for a data object from the data terminal in step 216, it specifies in step 218, with the aid of the allocation table, a cryptographic protocol (KP), the mandatory implementation of which the read access is supposed to be linked to by the data terminal. Presented as examples are three possible arrangements, including linking to a cryptographic protocol of an elevated security level beginning with step 200, linking to a cryptographic protocol of a higher security level beginning with step 210, and free access without linking to a cryptographic protocol.

When specifying the cryptographic protocol of elevated security level for the data object, the data terminal must authenticate itself to the electronic device in a Challenge-Response procedure based on a symmetrical cryptographic algorithm such as the 3DES or AES encryption algorithm. To this end, the electronic device sends a request (the challenge) to the data terminal in step 200, which must correctly answer the request and send the response back of the electronic device. In step 204 the electronic device receives the response of the data terminal and makes sure of its accuracy. And vice versa, in step 206 the electronic device can receive a request from the data terminal, which it answers in step 208 to authenticate itself vis-à-vis the data terminal. This respective one-sided authentication can also take place in one step in the form of a mutual authentication.

When specifying the cryptographic protocol of a higher security level for the data object, the data terminal must authenticate itself to the electronic device in a Challenge-Response procedure based on an asymmetrical cryptographic algorithm such as the RSA or elliptical curve cryptosystem. To this end the electronic device receives the public key of the data terminal in step 210. This can be provided with a digital signature, which the electronic device verifies in step 300. The verification can also be based on a certificate chain, at the end of which must be a topmost certification authority, whose public key is available in the electronic device. If the electronic device is integrated into an identity document, the topmost certification authority can be the issuing national authority or an international organization. In step 212 the electronic device sends a request to the data terminal which is based on the public key received, and through the answering of which the data terminal must prove that it is also in possession of the associated private key. In step 214 the electronic device receives the response from the data terminal and is therefore assured of its accuracy.

In step 302 with the aid of the allocation table, the electronic device can specify an encryption protocol according to which the data terminal and the electronic device communicate in encrypted form. Possible arrangements which are presented as examples include both the encryption of the communication with a session key, which is exchanged in step 304, and a free, unencrypted communication which circumvents step 304. Thus the Diffie-Hellman key exchange or a similar procedure is used in step 304, which allows the electronic device and the data terminal to derive a session key of high-level magnitude in a safe manner.

Figure 4:
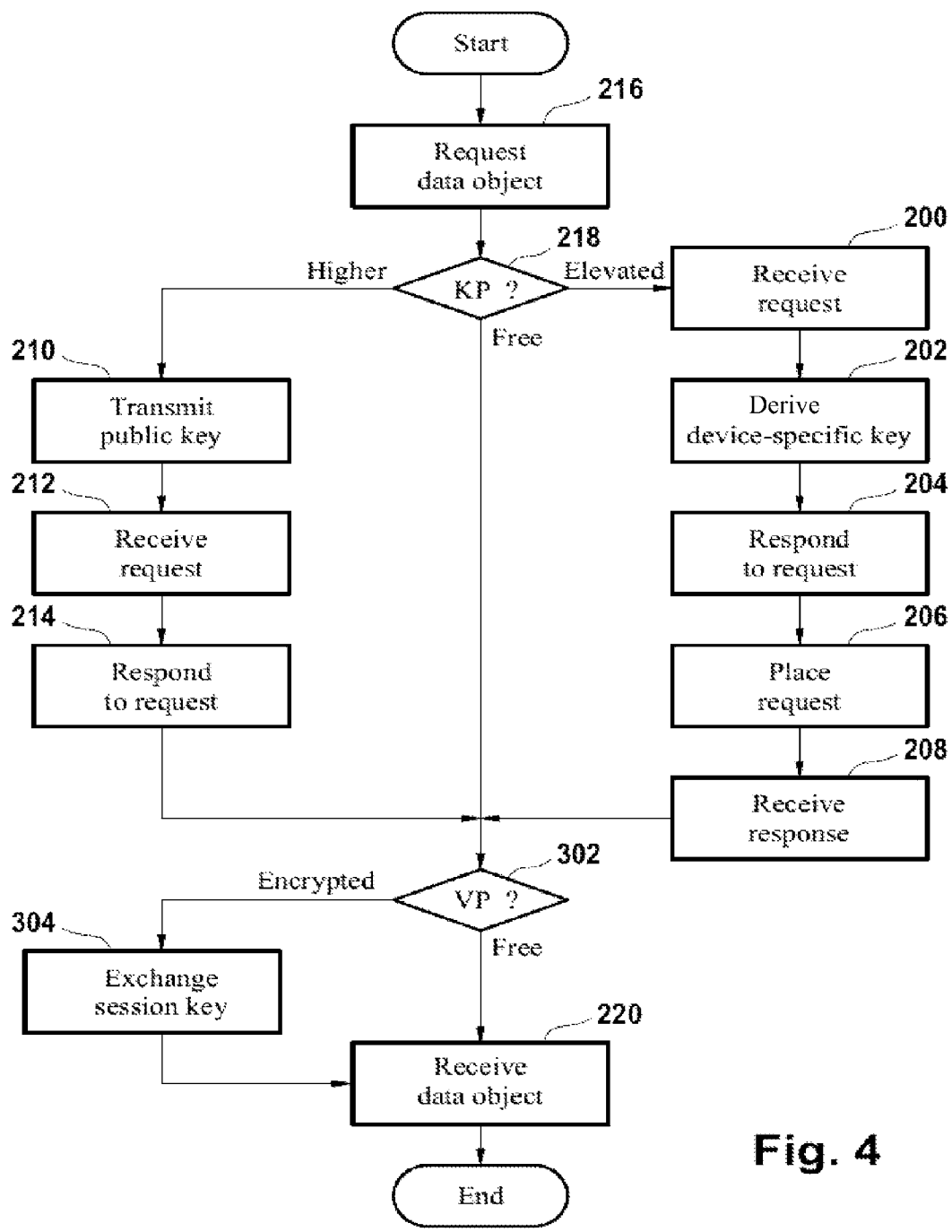

FIG. 4 shows a flow chart of the procedural steps implemented by a preferred embodiment of the data terminal according to the invention. After the data terminal has requested a data object from the electronic device in step 216, it follows the cryptographic protocol at branch 218, upon whose mandatory implementation the electronic device links read access to the data object. Similar to FIG. 3, three possible arrangements show examples of linking to a cryptographic protocol of elevated security level beginning with step 200, linking to a cryptographic protocol of higher security level beginning with step 210, and free access without linking to a cryptographic protocol.

When specifying the cryptographic protocol of elevated security level for the data object, the data terminal must authenticate itself to the electronic device in a Challenge-Response procedure based on a symmetrical cryptographic algorithm such as the 3DES or AES encryption algorithm. In step 200 the data terminal receives a request from the electronic device. The device-specific key, which the data terminal must derive from the machine-readable printed data of the electronic device to respond to the request in step 202, can be used for the symmetrical cryptographic algorithm. The data terminal thereby proves that it was visibly presented with a passport, for example, in which the electronic device is integrated. A general key may also be needed to derive the device-specific key from the machine-readable printed data. In step 204 the data terminal sends the response to the electronic device. Inversely, in step 206, a data terminal can send a request to the electronic device and receive the response in step 208.

When specifying the cryptographic protocol of a higher security level for the data object, the data terminal must authenticate itself to the electronic device in a Challenge-Response procedure based on an asymmetrical cryptographic algorithm such as the RSA or elliptical curve cryptosystem. To this end, the data terminal sends its public key to the electronic device in step 210. In step 212 the data terminal receives a request from the electronic device which is based on the transmitted public key and through the answering of which the data terminal, in step 214, proves that it is also in possession of the associated private key.

For example, let's assume the electronic device generates a random number. This is encrypted with the public key of the data terminal and the resulting cipher is transmitted to the data terminal by the electronic device. The data terminal decodes the cipher with its secret key and sends the result of the decoding [decryption] back to the electronic device. The electronic device then compares the originally generated random number with the result of decoding received from the data terminal. If both agree, the data terminal is classified as authentic and authorized.

The electronic device may additionally link the transmission of the data object to the mandatory execution of the steps of the cryptographic protocol of a higher security level with the steps of the protocol of the elevated security level.

In step 302 the electronic device can specify, with the aid of the allocation table, an encryption protocol according to which the data terminal and electronic device can communicate in encrypted manner. Presented by way of example as possible arrangements are the encrypting of the communication with a session key, which is exchanged in step 304, and a free, unencrypted communication whereby step 304 is circumvented.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCE NUMBER LIST

100 Data terminal
102 Electronic device
104 Data objects
106 Allocation table
108 Cryptographic protocol
109 Encryption protocol
110 Software application
112 Operating system
114 Identity document
116 Machine-readable printed data
118 Public key
120 Private key
122 Digital signature
124, 124' Computer-executable instructions
126 Memory [storage]
128, 128' Receiver
130, 130' Transmitter
140 Administrator function
142, 142' Contactless interface
146, 146' General key

The invention claimed is:

1. A method for a data terminal to access one or more of a number of data objects; stored in an electronic device, whereby:

the electronic device is integrated into an identifying document, which includes machine-readable printed data, and the electronic device includes an allocation table in which cryptographic protocols of different security levels are assigned to the number of data objects, the allocation table including: (i) a cryptographic protocol of an elevated security level being assigned to at least a first data object among the number of the data objects, the first data object including personal biometric data, (ii) a cryptographic protocol of a higher security level being assigned to at least a second data object among the number of the data objects, the second data object including personal biometric data, and (iii) at least a third data object among the number of data objects being assigned free access with no assigned cryptographic protocol, and the method comprising the steps of:
the data terminal transmitting a request to the electronic device for a particular data object among the number of data objects stored in the electronic device;
the electronic device: (i) processing the request received from the data terminal to determine the particular data object, (ii) electronically accessing the allocation table to determine the cryptographic protocol assigned to the particular data object, (iii) selecting the cryptographic protocol from the allocation table assigned to the particular data object, and (iv) specifying to the data terminal the selected cryptographic protocol required for the data terminal to obtain the particular data object from the electronic device;
conducting the cryptographic protocol of elevated security level between the electronic device and the data terminal when the particular data object is the first data object and the selected cryptographic protocol is the cryptographic protocol of elevated security level, and transmitting the first data object from the electronic device to the data terminal upon successful completion thereof;
conducting the cryptographic protocol of higher security level between the electronic device and the data terminal when the particular data object is the second data object and the selected cryptographic protocol is the cryptographic protocol of higher security level, and transmitting the second data object from the electronic device to the data terminal upon successful completion thereof; and
conducting no cryptographic protocol between the electronic device and the data terminal when the particular data object is the third data object and the assigned protocol is free access, and transmitting the third data object from the electronic device to the data terminal,
whereby the cryptographic protocol of elevated security level comprises the following steps:
the electronic device transmitting a request to the data terminal based on a symmetrical cryptographic algorithm, whereby a device-specific key is used, which is operable for derivation from the machine-readable printed data,
the data terminal reading the machine readable printed data from the identifying document and deriving the device-specific key from the machine-readable printed data, and
the data terminal responding to the request using the device-specific key, in order to authenticate itself to the electronic device,
whereby the data terminal includes a public key and a private key, and the cryptographic protocol of a higher security level comprises the following steps:
the data terminal transmitting the public key to the electronic device,
the electronic device transmitting a request for authentication to the data terminal using the public key, for which the private key is required to answer, and
the data terminal responding to the request for authentication by transmitting a response using the private key to the electronic device.

2. The method of claim 1, whereby the electronic device includes a software application, whereby the software application contains the allocation table, whereby the selected cryptographic protocol is specified to the data terminal by the software application, whereby the selected cryptographic protocol is implemented by the data terminal and the software application and the particular data object is transmitted by the software application to the data terminal.

3. The method of claim 2, whereby the electronic device includes an operating system, which prevents any unauthorized alteration or removal of the software application and only allows access to the number of data objects via the software application.

4. The method of claim 3, whereby the operating system, following authentication as an administrator of the electronic device, allows alteration or removal of the software application.

5. The method of claim 1, whereby the data terminal and the electronic device communicate in a contactless manner.

6. The method of claim 5, whereby: in the allocation table encryption protocols of different security levels are assigned to the number of data objects, according to which the data terminal, and the electronic device communicate in an encrypted manner.

7. The method of claim 1, whereby a general key, which is known to the electronic device and the data terminal, is required to derive a device-specific key from the machine-readable printed data.

8. The method of claim 1, whereby the cryptographic protocol of elevated security level furthermore comprises the following steps:
the data terminal transmitting a request to the electronic device based on a symmetrical cryptographic algorithm, whereby the device-specific key is used, and
the electronic device responding to the request using the device-specific key is used, to authenticate itself to the data terminal.

9. The method of claim 1, whereby the public key is characterized by a digital signature, and the electronic device verifies the digital signature.

10. An apparatus, comprising:
an electronic device integrated into an identifying document, which includes machine-readable printed data, and the electronic device includes an allocation table in which cryptographic protocols of different security levels are assigned to the number of data objects, the allocation table including: (i) a cryptographic protocol of an elevated security level being assigned to at least a first data object among the number of the data objects, the first data object including personal biometric data, (ii) a cryptographic protocol of a higher security level being assigned to at least a second data object among the number of the data objects, the second data object including personal biometric data, and (iii) at least a third data object among the number of data objects being assigned free access with no assigned cryptographic protocol; and
a processor operating to carry out computer-executable instructions that cause the apparatus to perform actions, including:
receiving a request from a data terminal for a particular data object among the number of data objects stored in the electronic device,
processing the request received from the data terminal to determine the particular data object,
electronically accessing the allocation table to determine the cryptographic protocol assigned to the particular data object,
selecting the cryptographic protocol from the allocation table assigned to the particular data object,
specifying to the data terminal the selected cryptographic protocol required for the data terminal to obtain the particular data object from the electronic device,
conducting the cryptographic protocol of elevated security level with the data terminal when the particular data object is the first data object and the selected cryptographic protocol is the cryptographic protocol of elevated security level, and transmitting the first data object to the data terminal upon successful completion thereof;

conducting the cryptographic protocol of higher security level with the data terminal when the particular data object is the second data object and the selected cryptographic protocol is the cryptographic protocol of higher security level, and transmitting the second data object to the data terminal upon successful completion thereof; and conducting no cryptographic protocol with the data terminal when the particular data object is the third data object and the assigned protocol is free access, and transmitting the third data object to the data terminal, whereby the cryptographic protocol of elevated security level comprises the following steps:
the electronic device transmitting a request to the data terminal based on a symmetrical cryptographic algorithm, whereby a device-specific key is used, which is operable for derivation from the machine-readable printed data,
the data terminal reading the machine readable printed data from the identifying document and deriving the device-specific key from the machine-readable printed data, and
the data terminal responding to the request using the device-specific key, in order to authenticate itself to the electronic device, whereby the data terminal includes a public key and a private key, and the cryptographic protocol of a higher security level comprises the following steps:
the data terminal transmitting the public key to the electronic device,
the electronic device transmitting a request for authentication to the data terminal using the public key, for which the private key is required to answer, and
the data terminal responding to the request for authentication by transmitting a response using the private key to the electronic device.

11. The apparatus of claim 10, whereby the allocation table and the computer-executable instructions are installed in the electronic device with an operating system in such a way that the operating system prevents any unauthorized alteration or removal of the allocation table or the computer-executable instructions.

12. The apparatus of claim 11, wherein access to the number of data objects is only possible via the computer-executable instructions.

13. A non-transitory digital storage medium including a computer program for execution by a processor, the computer program including:
an allocation table in which cryptographic protocols of different security levels are assigned to the number of data objects, the allocation table including: (i) a cryptographic protocol of an elevated security level being assigned to at least a first data object among the number of the data objects, the first data object including personal biometric data, (ii) a cryptographic protocol of a higher security level being assigned to at least a second data object among the number of the data objects, the second data object including personal biometric data, and (iii) at least a third data object among the number of data objects being assigned free access with no assigned cryptographic protocol; and computer-executable instructions that cause the processor to perform actions, including:
receiving a request from a data terminal for a particular data object among the number of data objects stored in the electronic device,
processing the request received from the data terminal to determine the particular data object,
electronically accessing the allocation table to determine the cryptographic protocol assigned to the particular data object,
selecting the cryptographic protocol from the allocation table assigned to the particular data object,
specifying to the data terminal the selected cryptographic protocol required for the data terminal to obtain the particular data object from the electronic device,
conducting the cryptographic protocol of elevated security level with the data terminal when the particular data object is the first data object and the selected cryptographic protocol is the cryptographic protocol of elevated security level, and transmitting the first data object to the data terminal upon successful completion thereof;
conducting the cryptographic protocol of higher security level with the data terminal when the particular data object is the second data object and the selected cryptographic protocol is the cryptographic protocol of higher security level, and transmitting the second data object to the data terminal upon successful completion thereof; and
conducting no cryptographic protocol with the data terminal when the particular data object is the third data object and the assigned protocol is free access, and transmitting the third data object to the data terminal,
whereby the cryptographic protocol of elevated security level comprises the following steps:
the electronic device transmitting a request to the data terminal based on a symmetrical cryptographic algorithm, whereby a device-specific key is used, which is operable for derivation from the machine-readable printed data,
the data terminal reading the machine readable printed data from the identifying document and deriving the device-specific key from the machine-readable printed data, and
the data terminal responding to the request using the device-specific key, in order to authenticate itself to the electronic device,
whereby the data terminal includes a public key and a private key, and the cryptographic protocol of a higher security level comprises the following steps:
the data terminal transmitting the public key to the electronic device,
the electronic device transmitting a request for authentication to the data terminal using the public key, for which the private key is required to answer, and
the data terminal responding to the request for authentication by transmitting a response using the private key to the electronic device.

14. An electronic device, comprising:
a memory storing a number of data objects,
a receiver for receiving a request from a data terminal for a particular data object among the number of data objects,
a transmitter for sending the particular data object to the data terminal,
an allocation table in which cryptographic protocols of different security levels are assigned to the number of data objects, the allocation table including: (i) a cryptographic protocol of an elevated security level being assigned to at least a first data object among the number of the data objects, and (ii) a cryptographic protocol of a higher security level being assigned to at least a second data object among the number of the data objects, a processor operating to execute program instructions, which cause the processor to execute actions, including:

receiving a request from a data terminal for a particular data object among the number of data objects stored in the electronic device, processing the request received from the data terminal to determine the particular data object, electronically accessing the allocation table to determine the cryptographic protocol assigned to the particular data object, selecting the cryptographic protocol from the allocation table assigned to the particular data object, specifying to the data terminal the selected cryptographic protocol required for the data terminal to obtain the particular data object from the electronic device, conducting the cryptographic protocol of elevated security level with the data terminal when the particular data object is the first data object and the selected cryptographic protocol is the cryptographic protocol of elevated security level, and transmitting the first data object to the data terminal upon successful completion thereof; and conducting the cryptographic protocol of higher security level with the data terminal when the particular data object is the second data object and the selected cryptographic protocol is the cryptographic protocol of higher security level, and transmitting the second data object to the data terminal upon successful completion thereof.

15. The electronic device of claim 14, further comprising a software application, which includes the program instructions, whereby the software application includes the allocation table, whereby the assigned cryptographic procotcol is selected by the software application, whereby the cryptographic protocols are operable for implementation by the data terminal and the software application, and the particular data object is operable for transmission via the software application.

16. The electronic device of claim 15, further comprising an operating system, whereby the operating system is designed to prevent any unauthorized alteration or removal of the software application and to prevent access to the number of data objects by circumventing the software application.

17. The electronic device of claim 16, whereby the operating system includes an administrator function for authenticating as administrator, whereby after authentication as administrator of the electronic device, alteration or removal of the software application is possible.

18. The electronic device according to claim 14, whereby the electronic device is integrated into an identifying document.

19. The electronic device according to claim 14, whereby at least one of the number of data objects includes personal biometric data.

20. The electronic device according to claim 14, further comprising an interface for contactless communication with the data terminal.

21. The electronic device of claim 20, whereby in the allocation table, encryption protocols of different security levels are assigned to the number of data objects, according to which the data terminal and the electronic device communicate in encrypted manner.

22. The electronic device according to claim 14, whereby:

the allocation table includes at least a third data object among the number of data objects is assigned free access with no assigned cryptographic protocol; and the processor executes actions further including conducting no cryptographic protocol with the data terminal when the particular data object is the third data object and the assigned protocol is free access, and transmitting the third data object to the data terminal.

23. The electronic device of claim 14, whereby:

the electronic device includes machine-readable printed data, and the cryptographic protocol of elevated security level includes the following steps:

the electronic device transmitting a request to the data terminal based on a symmetrical cryptographic algorithm, whereby a device-specific key is used, which is operable for derivation from the machine-readable printed data, the data terminal reading the machine readable printed data from the identifying document and deriving the device-specific key from the machine-readable printed data, and the data terminal responding to the request using the device-specific key, in order to authenticate itself to the electronic device.

24. The electronic device of claim 23, whereby a general key which is known to the electronic device and the data terminal is required to derive the device-specific key from the machine-readable printed data.

25. The electronic device of claim 23, whereby the cryptographic protocol of elevated security level also comprises the following steps:

the data terminal transmitting a request to the electronic device based on a symmetrical cryptographic algorithm, whereby the device-specific key is used, and the electronic device responding to the request using the device-specific key in order to authenticate itself to the data terminal.

26. The electronic device according to claim 14, whereby:

the data terminal includes a public key and a private key, and the cryptographic protocol of higher security level comprises the following steps:

the data terminal transmitting the public key to the electronic device, the electronic device transmitting a request for authentication to the data terminal using the public key, for which the private key is required to answer, and the data terminal responding to the request for authentication by transmitting a response using the private key to the electronic device.

27. The electronic device of claim 26, whereby the public key is characterized by a digital signature, and the electronic device verifies the digital signature.

28. A system, comprising:

a data terminal, comprising: (i) a transmitter for transmitting a request for a particular data object from among a number of data objects, and (ii) a receiver for receiving the particular data object;

an electronic device, comprising: (i) a memory storing the number of data objects, (ii) a receiver for receiving a request from the data terminal for the particular data object, (iii) a transmitter for sending the particular data object to the data terminal, and (iv) an allocation table in which cryptographic protocols of different security levels are assigned to the number of data objects, the allocation table including: (i) a cryptographic protocol of an elevated security level being assigned to at least a first data object among the number of the data objects, and (ii) a cryptographic protocol of a higher security level being assigned to at least a second data object among the number of the data objects, wherein:

the data terminal transmits the request for the particular data object to the electronic device, the electronic device processes the request received from the data terminal to determine the particular data object, the electronic device electronically accesses the allocation table to determine the cryptographic protocol assigned to the particular data object, the electronic device selects the cryptographic protocol from the allocation table assigned to the particular data object, the electronic device specifies to the data terminal the selected cryptographic protocol required for the data terminal to obtain the particular data object from the electronic device, the electronic device and the data terminal conduct the cryptographic protocol of elevated security level when the particular data object is the first data object and the selected cryptographic protocol is the cryptographic protocol of elevated security level, and the electronic device transmits the first data object to the data terminal upon successful completion thereof; and the electronic device and the data terminal conduct the cryptographic protocol of higher security level when the particular data object is the second data object and the selected cryptographic protocol is the cryptographic protocol of higher security level, and the electronic device transmits the second data object to the data terminal upon successful completion thereof.

29. The system of claim 28, further comprising an interface for contactless communication the electronic device and the data terminal.

30. The system of claim 29, whereby the receiver of the data terminal receives a specified encryption protocol from the electronic device, and further communications of the data terminal with the electronic device are encrypted according to the encryption protocol.

31. The system according to claim 28, whereby the electronic device includes machine-readable printed data, whereby the receiver of the data terminal receives the specified cryptographic protocol of elevated security level, which comprises the following steps:

the electronic device transmitting a request to the data terminal based on a symmetrical cryptographic algorithm, whereby a device-specific key is used, which is operable for derivation from the machine-readable printed data, the data terminal reading the machine readable printed data from the identifying document and deriving the device-specific key from the machine-readable printed data, and the data terminal responding to the request using the device-specific key, in order to authenticate itself to the electronic device.

32. The system of claim 31, whereby a second cryptographic key, which is known to the electronic device and the data terminal, is required to derive the device-specific key from the machine-readable printed data.

33. The system of claim 31, whereby the cryptographic protocol of elevated security level further comprises the following steps:

the data terminal transmitting a request to the electronic device based on a symmetrical cryptographic algorithm, whereby the device-specific key is used, and the electronic device responding to the request using the device-specific key in order to authenticate itself to the data terminal.

34. The system according to claim 28, whereby the data terminal includes a public key and a private key, whereby the receiver of the data terminal receives the specified cryptographic protocol of higher security level, which comprises the following steps:

the data terminal transmitting the public key to the electronic device, the electronic device transmitting a request for authentication to the data terminal using the public key, for which the private key is required to answer, and the data terminal responding to the request for authentication by transmitting a response using the private key to the electronic device.

35. The system of claim 34, whereby the public key is characterized by a digital signature, and the electronic device verifies the digital signature.

36. An identifying document, comprising an integrated electronic device, the electronic device, comprising:

a memory storing a number of data objects, a receiver for receiving a request from a data terminal for a particular data object among the number of data objects, a transmitter for sending the particular data object to the data terminal, an allocation table in which cryptographic protocols of different security levels are assigned to the number of data objects, the allocation table including: (i) a cryptographic protocol of an elevated security level being assigned to at least a first data object among the number of the data objects, and (ii) a cryptographic protocol of a higher security level being assigned to at least a second data object among the number of the data objects, a processor operating to execute program instructions, which cause the processor to execute actions, including:

receiving a request from a data terminal for a particular data object among the number of data objects stored in the electronic device, processing the request received from the data terminal to determine the particular data object, electronically accessing the allocation table to determine the cryptographic protocol assigned to the particular data object, selecting the cryptographic protocol from the allocation table assigned to the particular data object, specifying to the data terminal the selected cryptographic protocol required for the data terminal to obtain the particular data object from the electronic device, conducting the cryptographic protocol of elevated security level with the data terminal when the particular data object is the first data object and the selected cryptographic protocol is the cryptographic protocol of elevated security level, and transmitting the first data object to the data terminal upon successful completion thereof; and conducting the cryptographic protocol of higher security level with the data terminal when the particular data object is the second data object and the selected cryptographic protocol is the cryptographic protocol of higher security level, and transmitting the second data object to the data terminal upon successful completion thereof.

37. A method for a data terminal to access one or more of a number of data objects stored in an electronic device, whereby:

the electronic device being integrated into an identifying document and including an allocation table, in which cryptographic protocols of different security levels are assigned to the number of data objects, the allocation table including: (i) a cryptographic protocol of an elevated security level being assigned to at least a first data object among the number of the data objects, and (ii) a cryptographic protocol of a higher security level being assigned to at least a second data object among the number of the data objects, each of the cryptographic protocols is used to authenticate the data terminal, implementation of the cryptographic protocol assigned to a particular data object among the number of data objects in the allocation table is a condition for access by the data terminal to such particular data object, and the method comprises the following steps:

the data terminal transmitting a request to the electronic device for the particular data object, the electronic device selecting and specifying the cryptographic protocol assigned to the particular data object from the allocation table, the electronic device and the data terminal conducting the selected cryptographic protocol, and the electronic device transmitting the particular electronic device upon successful completion of the selected cryptographic protocol.

\* \* \* \* \*